(12) United States Patent
Wade

(10) Patent No.: US 6,236,780 B1
(45) Date of Patent: May 22, 2001

(54) WAVELENGTH DIVISION MULTIPLEXING/DEMULTIPLEXING DEVICES USING DUAL DIFFRACTIVE OPTIC LENSES

(75) Inventor: Robert K. Wade, Stratham, NH (US)

(73) Assignee: Light Chip, Inc., Salem, NH (US)

( * ) Notice: Subject to any disclaimer, the term of this patent is extended or adjusted under 35 U.S.C. 154(b) by 0 days.

(21) Appl. No.: 09/363,042

(22) Filed: Jul. 29, 1999

Related U.S. Application Data

(63) Continuation-in-part of application No. 08/990,199, filed on Dec. 13, 1997, now Pat. No. 5,999,672.

(51) Int. Cl.[7] .................... G02B 6/34; H04J 14/02
(52) U.S. Cl. .................... 385/37; 385/14; 385/31; 385/33; 385/24; 385/46; 385/47; 359/124; 359/130; 359/131
(58) Field of Search ................ 385/14, 15, 31, 385/33, 37, 46, 47, 24; 359/124, 130, 131

(56) References Cited

U.S. PATENT DOCUMENTS

| | | | |
|---|---|---|---|
| 4,111,524 | 9/1978 | Tomlinson, III | 385/37 X |
| 4,153,330 | 5/1979 | Tomlinson, III | 385/37 X |
| 4,198,117 | 4/1980 | Kobayashi | 385/37 X |
| 4,274,706 | 6/1981 | Tangonan | 385/37 X |
| 4,279,464 | 7/1981 | Colombini | 385/37 X |
| 4,299,488 | 11/1981 | Tomlinson, III | 356/328 |
| 4,343,532 | 8/1982 | Palmer | 385/37 X |
| 4,387,955 | 6/1983 | Ludman et al. | 385/37 X |
| 4,479,697 | 10/1984 | Kapany et al. | 385/33 X |
| 4,522,462 | 6/1985 | Large et al. | 385/37 X |
| 4,583,820 | 4/1986 | Flamand et al. | 385/37 X |
| 4,622,662 | 11/1986 | Laude et al. | 370/3 |
| 4,626,069 | 12/1986 | Dammann et al. | 350/162.2 |
| 4,634,215 | 1/1987 | Reule | 385/37 X |
| 4,643,519 | 2/1987 | Bussard et al. | 385/37 X |
| 4,652,080 | 3/1987 | Carter et al. | 385/37 X |
| 4,671,607 | 6/1987 | Laude | 385/37 X |
| 4,703,472 | 10/1987 | Blumentritt et al. | 370/3 |
| 4,708,425 | 11/1987 | Gouali et al. | 350/96.16 |
| 4,726,645 | 2/1988 | Yamashita et al. | 385/33 X |
| 4,740,951 | 4/1988 | Lizet et al. | 370/3 |
| 4,741,588 | 5/1988 | Nicia et al. | 385/37 X |
| 4,744,618 | 5/1988 | Mahlein | 385/37 X |
| 4,746,186 | 5/1988 | Nicia | 385/14 X |
| 4,748,614 | 5/1988 | Dammann et al. | 370/3 |
| 4,749,247 | 6/1988 | Large | 385/37 X |
| 4,752,108 | 6/1988 | Vollmer | 385/14 X |
| 4,760,569 | 7/1988 | Mahlein | 350/3 |
| 4,763,969 | 8/1988 | Khoe et al. | 385/37 X |
| 4,773,063 | 9/1988 | Hunsperger et al. | 370/3 |
| 4,786,133 | 11/1988 | Gidon et al. | 385/37 X |
| 4,819,224 | 4/1989 | Laude | 370/3 |

(List continued on next page.)

FOREIGN PATENT DOCUMENTS

| | | | |
|---|---|---|---|
| 859 249 A1 | 8/1998 | (EP) | 359/124 X |
| WO 99/31532 | 6/1999 | (WO) | 359/124 X |

OTHER PUBLICATIONS

Fujii, Y. et al, "Optical Demultiplexer Utilizing an Ebert Mounting Silicon Grating", Journal Of Lightwave Technology, US, IEEE, New York, vol. LT–2,(1984) Oct., No. 5, New York, pp. 31–734, XP002058271, ISSN: 0733–8724 abstract; figures 1, 2,4.

(List continued on next page.)

Primary Examiner—Brian Healy
(74) Attorney, Agent, or Firm—Hunton & Williams

(57) ABSTRACT

A wavelength division multiplexing device is disclosed. In a preferred embodiment, the wavelength division multiplexing device comprises a diffractive optic collimating lens for collimating a plurality of monochromatic optical beams, a diffraction grating for combining the plurality of collimated, monochromatic optical beams into a multiplexed, polychromatic optical beam, and a diffractive optic focusing lens for focusing the multiplexed, polychromatic optical beam.

52 Claims, 8 Drawing Sheets

U.S. PATENT DOCUMENTS

| | | | |
|---|---|---|---|
| 4,834,485 | 5/1989 | Lee | 385/37 X |
| 4,836,634 | 6/1989 | Laude | 385/37 X |
| 4,857,726 | 8/1989 | Kinney et al. | 250/226 |
| 4,923,271 | 5/1990 | Henry et al. | 350/96.19 |
| 4,926,412 | 5/1990 | Jannson et al. | 370/3 |
| 4,930,855 | 6/1990 | Clark et al. | 385/37 X |
| 4,934,784 | 6/1990 | Kapany et al. | 385/33 X |
| 5,026,131 | 6/1991 | Jannson et al. | 385/37 X |
| 5,107,359 | 4/1992 | Ohuchida | 359/124 |
| 5,170,451 | 12/1992 | Ohshima | 385/43 |
| 5,228,103 | 7/1993 | Chen et al. | 385/14 |
| 5,278,687 | 1/1994 | Jannson et al. | 359/125 |
| 5,355,237 | 10/1994 | Lang et al. | 359/130 |
| 5,363,220 | 11/1994 | Kuwayama et al. | 359/3 |
| 5,440,416 | 8/1995 | Cohen et al. | 359/127 |
| 5,442,472 | 8/1995 | Skrobko | 359/110 |
| 5,450,510 | 9/1995 | Boord et al. | 385/37 |
| 5,457,573 | 10/1995 | Iida et al. | 359/569 |
| 5,500,910 | 3/1996 | Boudreau et al. | 385/24 |
| 5,513,289 | 4/1996 | Hosokawa et al. | 385/33 |
| 5,526,155 | 6/1996 | Knox et al. | 359/130 |
| 5,541,774 | 7/1996 | Blankenbecler | 359/653 |
| 5,555,334 | 9/1996 | Ohnishi et al. | 385/93 |
| 5,583,683 | 12/1996 | Scobey | 359/127 |
| 5,606,434 | 2/1997 | Feldman et al. | 359/3 |
| 5,657,406 | 8/1997 | Bell | 385/24 |
| 5,703,722 | 12/1997 | Blankenbecler | 359/653 |
| 5,742,416 | 4/1998 | Mizrahi | 359/124 |
| 5,745,270 | 4/1998 | Koch | 359/124 |
| 5,745,271 | 4/1998 | Ford et al. | 359/130 |
| 5,745,612 | 4/1998 | Wang et al. | 385/24 |
| 5,748,350 | 5/1998 | Pan et al. | 359/130 |
| 5,748,815 | 5/1998 | Hamel et al. | 385/37 |
| 5,768,450 | 6/1998 | Bhagavatula | 385/24 |
| 5,777,763 | 7/1998 | Tomlinson, III | 359/130 |
| 5,999,672 * | 12/1999 | Hunter et al. | 385/37 |

OTHER PUBLICATIONS

G.R. Harrison, Ph.D., Sc.D. et al., Practical Spectroscopy, Chapter 4—Diffraction–Grating Spectrographs, Prentice–Hall (1948).

W. J. Tomlinson, Wavelength multiplexing in multimode optical fibers, Applied Optics, vol. 16, No. 8 (Aug. 1977).

W. J. Tomlinson et al., Optical multiplexer for multimode fiber transmission systems, Appl. Phys. Lett., vol. 31, No. 3 (Aug. 1977).

W. J. Tomlinson et al., Optical wavelength–division multiplexer for the 1–1.4 µm spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM systems in the 0.8µm wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No.3 (Jan. 31, 1980).

K. Kobayashi et al., Microoptic Grating Multiplexers and Optical Isolators for Fiber–Optic Communications, Journal of Quantum Electronics, vol. QE–16, No. 1 (Jan. 1980).

Yohji Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B. D. Metcalf et al., High–capacity wavelength demultiplexer with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle Gratings Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288.

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channel spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20 – Channel Micro–Optic Grating Demultiplexer for 1.1–1.6um Band Using a Small Focusing Parameter Graded–Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2, (Jan. 22, 1981).

J. Laude et al., Wavelength division multiplexing/demultiplexing (WDM) using diffraction gratings, SPIE, vol. 503, Application, Theory, and Fabricationof Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with multiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1 – 1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

\* cited by examiner

WAVELENGTH DIVISION MULTIPLEXING/DEMULTIPLEXING DEVICES USING DUAL DIFFRACTIVE OPTIC LENSES

CROSS-REFERENCE TO RELATED APPLICATIONS

This patent application is a continuation-in-part patent application of U.S. patent application Ser. No. 08/990,199 now U.S. Pat. No. 5,999,672, issued Dec. 7, 1999, filed Dec. 13, 1997, which is hereby incorporated by reference herein in its entirety.

This patent application is related to U.S. patent application Ser. No. 09/363,041 pending, filed concurrently herewith and hereby incorporated by reference herein in its entirety.

FIELD OF THE INVENTION

The present invention relates generally to wavelength division multiplexing/demultiplexing and, more particularly, to wavelength division multiplexing/demultiplexing devices using dual diffractive optic lenses.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels in and out, respectively, of an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

During the past 20 years, various types of WDMs have been proposed and demonstrated. For example, (1) W. J. Tomlinson, *Applied Optics*, Vol. 16, No. 8, pp. 2180–2194 (August 1977); (2) A. C. Livanos et al., *Applied Physics Letters*, Vol. 30, No. 10, pp. 519–521 (May 15, 1977); (3) H. Ishio et al., *Journal of Lightwave Technology*, Vol 2, No. 4, pp. 448–463 (August 1984); (4) H. Obara et al., *Electronics Letters*, Vol. 28, No. 13, pp. 1268–1270 (Jun. 18, 1992); (5) A. E. Willner et al., *IEEE Photonics Technology Letters*, Vol. 5, No. 7, pp. 838–841 (July 1993); and (6) Y. T. Huang et al., *Optical Letters*, Vol. 17, No. 22, pp. 1629–1631 (Nov. 15, 1992), all disclose some form of WDM device and/or method. However, the WDM devices and/or methods disclosed in the above-listed publications are all classical optics-based WDM approaches which employ very basic lenses that are adequate only for use with multimode optical fibers and are inadequate for use with single mode optical fibers because the core diameter of a single mode optical fiber (i.e., typically 8 $\mu$m) is much smaller than the core diameter of a multimode optical fiber (i.e., typically 62.5 $\mu$m). That is, due to the very basic lenses employed therein, WDM devices incorporating the principles set forth in the classical optics-based WDM approaches disclosed in the above-listed publications are unable to receive and transmit optical beams from and to single mode optical fibers, respectively, without incurring unacceptable amounts of insertion loss and channel crosstalk. These unacceptable levels of insertion loss and channel crosstalk are largely due to the inadequate imaging capabilities of these very basic lenses, which are typically formed of standard optical glass materials.

One proposed solution to the above-described optical imaging problem has been to add additional lenses formed of standard optical glass materials to WDM devices, thereby resulting in WDM devices having doublet, triplet, and even higher number lens configurations. By adding these additional lenses to WDM devices, wherein the added lenses typically have alternating high and low refraction indexes, aberrations caused mainly by the spherical nature of the lenses are effectively canceled out. However, an increased cost is associated with adding these additional lenses due to the direct cost of the additional lenses, as well as the indirect costs associated with the increased complexity and resulting decreased manufacturability of WDM devices having multiple lenses.

Another proposed solution to the above-described optical imaging problem has been to use gradient refractive index lenses (e.g., Gradium lenses) in WDM devices. The use of these gradient refractive index lenses results in a significant improvement in the quality of the imaging system within WDM devices. However, costs associated with manufacturing these gradient refractive index lenses is significantly greater than the costs associated with manufacturing standard homogeneous index lenses, despite the fact that both are typically formed of standard optical glass materials.

In view of the foregoing, there remains a real need for a WDM device which possesses or allows for all the characteristics of: low cost, component integration, environmental and thermal stability, low channel crosstalk, low channel signal loss, ease of interfacing, large number of channels, and narrow channel spacing. Accordingly, it would be desirable to provide a WDM device which overcomes the above-described inadequacies and shortcomings, while possessing or allowing for all of the above-stated characteristics.

OBJECTS OF THE INVENTION

The primary object of the present invention is to provide wavelength division multiplexing/demultiplexing devices which use dual diffractive optic lenses to achieve increased device performance, as well as reduced device cost, complexity, and manufacturing risk.

The above-stated primary object, as well as other objects, features, and advantages, of the present invention will become readily apparent from the following detailed description which is to be read in conjunction with the appended drawings.

SUMMARY OF THE INVENTION

According to the present invention, a wavelength division multiplexing device is provided. In a preferred embodiment, the wavelength division multiplexing device comprises a diffractive optic collimating lens for collimating a plurality of monochromatic optical beams, a diffraction grating for combining the plurality of collimated, monochromatic optical beams into a multiplexed, polychromatic optical beam, and a diffractive optic focusing lens for focusing the multiplexed, polychromatic optical beam.

The diffractive optic collimating lens and the diffractive optic focusing lens have substantially planar front and back surfaces, and a microscopic pattern associated with the diffractive optic can be formed on either the substantially planar front surface or the substantially planar back surface of the diffractive optic collimating lens and the diffractive optic focusing lens. The diffractive optic collimating lens and the diffractive optic focusing lens can both be one of several types such as, for example, a binary diffractive optic lens or a Fresnel diffractive optic lens.

The diffractive optic collimating lens and the diffractive optic focusing lens preferably operate in the infrared (IR) region of the electromagnetic spectrum since this is the region where the power loss (attenuation) and dispersion of silica-based optical fibers is very low. Accordingly, the diffractive optic collimating lens and the diffractive optic focusing lens are typically formed of a material selected from the group consisting of glass, crystalline, and plastic, as well as from any of a number of other appropriate materials that efficiently transmit optical beams in the infrared (IR) region of the electromagnetic spectrum.

The diffraction grating is preferably a transmissive diffraction grating, and the wavelength division multiplexing device preferably comprises a transmissive element associated with the transmissive diffraction grating. The transmissive element preferably has at least one reflective surface for reflecting the multiplexed, polychromatic optical beam, or for reflecting the plurality of collimated, monochromatic optical beams.

In accordance with other aspects of the present invention, the wavelength division multiplexing device can be provided in integrated form. That is, an integrated wavelength division multiplexing device can be provided comprising a diffractive optic collimating lens for collimating a plurality of monochromatic optical beams, a first homogeneous index boot lens affixed to the diffractive optic collimating lens for transmitting the plurality of collimated, monochromatic optical beams from the diffractive optic collimating lens, wherein the first homogeneous index boot lens has a planar exit surface, and a diffraction grating formed at the planar exit surface of the first homogeneous index boot lens for combining the plurality of collimated, monochromatic optical beams into a multiplexed, polychromatic optical beam.

In accordance with further aspects of the present invention, the first homogeneous index boot lens can be incorporated into the diffractive optic collimating lens such that the diffractive optic collimating lens has the planar exit surface at which the diffraction grating is formed.

In accordance with still further aspects of the present invention, the integrated wavelength division multiplexing device can include a second homogeneous index boot lens affixed to the diffractive optic collimating lens for transmitting the plurality of monochromatic optical beams to the diffractive optic collimating lens. The second homogeneous index boot lens preferably has a planar entry surface for accepting the plurality of monochromatic optical beams from at least one optical source (e.g., optical fibers, laser diodes). Alternatively, the integrated wavelength division multiplexing device may do without the second homogeneous index boot lens, and the diffractive optic collimating lens can have a planar entry surface for accepting the plurality of monochromatic optical beams from at least one optical source.

In accordance with still further aspects of the present invention, the diffraction grating is preferably a transmissive diffraction grating, and the integrated wavelength division multiplexing device can include a transmissive element associated with the transmissive diffraction grating, wherein the transmissive element preferably has at least one reflective surface for reflecting the multiplexed, polychromatic optical beam. The integrated wavelength division multiplexing device can then also include a second homogeneous index boot lens affixed to the transmissive element for transmitting the multiplexed, polychromatic optical beam from the transmissive element, and a diffractive optic focusing lens affixed to the second homogeneous index boot lens for focusing the multiplexed, polychromatic optical beam. The second homogeneous index boot lens can be incorporated into the diffractive optic focusing lens such that the diffractive optic focusing lens is affixed to the transmissive element. The integrated wavelength division multiplexing device can then further include a third homogeneous index boot lens affixed to the diffractive optic focusing lens for transmitting the focused, multiplexed, polychromatic optical beam from the diffractive optic focusing lens. The third homogeneous index boot lens preferably has a planar exit surface for outputting the focused, multiplexed, polychromatic optical beam to at least one optical receiver (e.g., optical fibers, photodetectors). Alternatively, the integrated wavelength division multiplexing device may do without the third homogeneous index boot lens, and the diffractive optic focusing lens can have a planar exit surface for outputting the focused, multiplexed, polychromatic optical beam to at least one optical receiver.

In accordance with other aspects of the present invention, the wavelength division multiplexing device can be provided in an alternative integrated form. That is, an alternative integrated wavelength division multiplexing device can be provided comprising a diffractive optic focusing lens for focusing a multiplexed, polychromatic optical beam, a first homogeneous index boot lens affixed to the diffractive optic focusing lens for transmitting the multiplexed, polychromatic optical beam to the diffractive optic focusing lens, wherein the first homogeneous index boot lens has a planar entry surface, and a diffraction grating formed at the planar entry surface of the first homogeneous index boot lens for combining a plurality of monochromatic optical beams into the multiplexed, polychromatic optical beam.

In accordance with further aspects of the present invention, the first homogeneous index boot lens can be incorporated into the diffractive optic focusing lens such that the diffractive optic focusing lens has the planar entry surface at which the diffraction grating is formed.

In accordance with still further aspects of the present invention, the diffraction grating is preferably a transmissive diffraction grating, and the alternative integrated wavelength division multiplexing device can include a transmissive element associated with the transmissive diffraction grating, wherein the transmissive element preferably has at least one reflective surface for reflecting the plurality of monochromatic optical beams toward the transmissive diffraction grating. The alternative integrated wavelength division multiplexing device can then also include a second homogeneous index boot lens affixed to the transmissive element for transmitting the plurality of monochromatic optical beams to the transmissive element, and a diffractive optic collimating lens affixed to the second homogeneous index boot lens for collimating the plurality of monochromatic optical beams prior to transmission by the second homogeneous index boot lens. The second homogeneous index boot lens can be incorporated into the diffractive optic collimating lens such that the diffractive optic collimating lens is affixed to the transmissive element.

At this point it should be noted that the above-described wavelength division multiplexing device, integrated wavelength division multiplexing device, and alternative integrated wavelength division multiplexing device are all bidirectional devices. Thus, the wavelength division multiplexing device can also be a wavelength division demultiplexing device, the integrated wavelength division multiplexing device can also be an integrated wavelength division demultiplexing device, and the alternative integrated wavelength division multiplexing device can also be an alternative integrated wavelength division demultiplexing device. Further, all of the above-described devices can be used simultaneously as both a multiplexer and a demultiplexer.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a perspective end view of a portion of the wavelength division multiplexing device shown in FIG. 1a.

FIG. 3a is a perspective view of a coupling device containing a plurality of laser diodes for replacing the plurality of optical input fibers in the multiplexing device shown in FIG. 1a.

DETAILED DESCRIPTION OF PREFERRED EMBODIMENTS

Figure 1A:
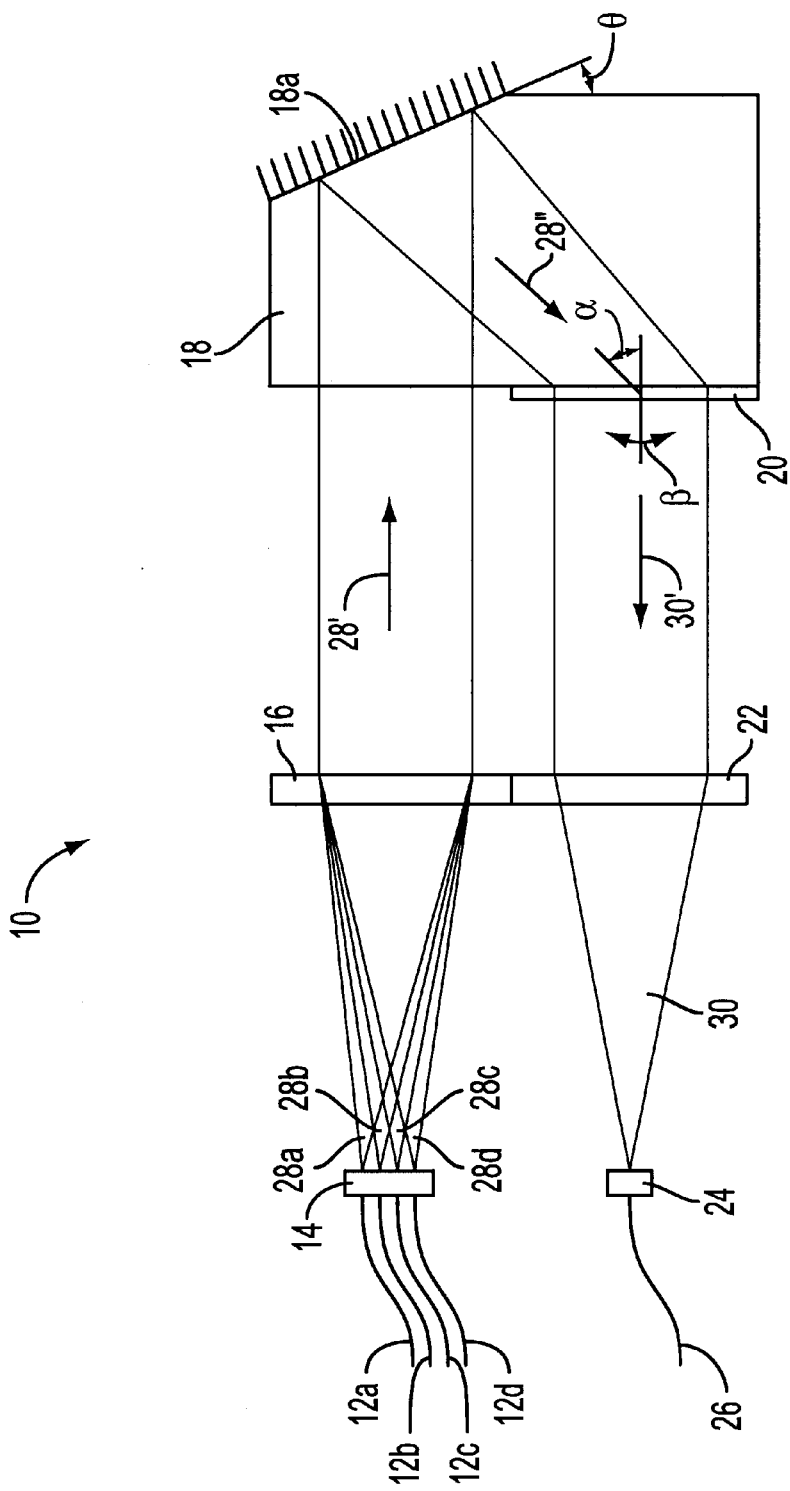
FIG. 1a is a side view of a wavelength division multiplexing device having dual diffractive optic collimating/focusing lenses and a transmissive diffraction grating in accordance with the present invention.

Referring to FIG. 1a, there is shown a side view of a preferred embodiment of a wavelength division multiplexing device 10 in accordance with the present invention. The multiplexing device 10 comprises a plurality of optical input fibers 12, an input fiber coupling device 14, a diffractive optic collimating lens 16, a reflecting element 18 having a reflecting surface 18a, a transmissive diffraction grating 20, a diffractive optic focusing lens 22, an output fiber coupling device 24, and a single optical output fiber 26.

At this point it should be noted that the optical input fibers 12 and the optical output fiber 26, as well as any other optical fibers described herein as being used in conjunction with WDM devices in accordance with the present invention, are single mode optical fibers. Of course, however, this does not limit the present invention WDM devices to use with only single mode optical fibers. For example, the present invention WDM devices can also be used with multimode optical fibers.

It should also be noted that the multiplexing device 10, as well as any other WDM devices described herein as being WDM devices in accordance with the present invention, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Figure 1B:
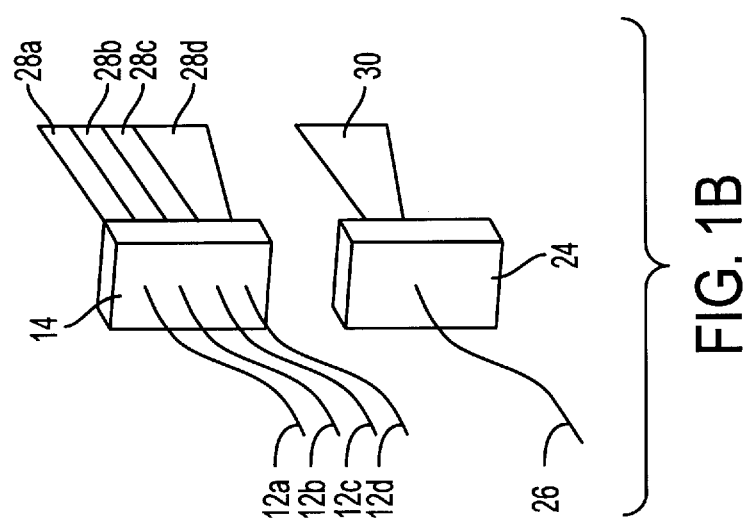

Returning to FIG. 1a, the plurality of optical input fibers 12 are grouped into a one-dimensional input fiber array (i.e., a 1×4 array) by the input fiber coupling device 14, while the single optical output fiber 26 is secured to the output fiber coupling device 24. Both the input fiber coupling device 14 and the output fiber coupling device 24 are used for purposes of ease of optical fiber handling and precision placement, and can be formed of, for example, a silicon V-groove assembly. Referring to FIG. 1b, there is shown a perspective end view of a portion of the multiplexing device 10 revealing how the plurality of optical input fibers 12 are grouped into the one-dimensional input fiber array by the input fiber coupling device 14, and how the single optical output fiber 26 is secured to the output fiber coupling device 24. FIG. 1b also shows a monochromatic optical input beam 28 being transmitted from each of the plurality of optical input fibers 12, and a single multiplexed, polychromatic optical output beam 30 being transmitted to the single optical output fiber 26.

Each of the monochromatic optical input beams 28 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 28 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 28 are appropriately preselected such that the data channels do not interfere with each other (i.e., there is sufficient channel spacing), and the optical transmission losses through both the optical input fibers 12 and the optical output fiber 26 are low, as is also well known in the art.

The single multiplexed, polychromatic optical output beam 30 being transmitted to the single optical output fiber 26 is carrying a plurality of channels of data at the unique wavelengths of each of the plurality of monochromatic optical input beams 28. The plurality of monochromatic optical input beams 28 are combined into the single multiplexed, polychromatic optical output beam 30 through the combined operation of the diffractive optic collimating lens 16, the transmissive diffraction grating 20, and the diffractive optic focusing lens 22, as will be described in more detail below.

Referring again to FIG. 1a, each of the plurality of monochromatic optical input beams 28 are transmitted from their corresponding optical input fiber 12 into the air space between the input fiber coupling device 14 and the diffractive optic collimating lens 16. Within this air space, the plurality of monochromatic optical input beams 28 are expanded in diameter until they become incident upon the diffractive optic collimating lens 16. The diffractive optic collimating lens 16 collimates each of the plurality of monochromatic optical input beams 28, and then transmits each of a plurality of collimated, monochromatic optical input beams 28' to the reflecting element 18.

The reflecting element 18 is fabricated of a transmissive material such as, for example, optical glass. Thus, each of the plurality of collimated, monochromatic optical input beams 28' is transmitted through the reflecting element 18 toward the reflecting surface 18a, which is formed at a reflecting angle, θ, on a beveled edge of the reflecting element 18. The reflecting surface 18a reflects each of the plurality of collimated, monochromatic optical input beams 28' such that a plurality of reflected, collimated, monochromatic optical input beams 28" are transmitted through the reflecting element 18 toward the transmissive diffraction grating 20. The reflecting angle, θ, is chosen based upon the desired center wavelength diffraction angle of the transmissive diffraction grating 20, as will be described in more detail below.

The transmissive diffraction grating 20 operates to angularly disperse the plurality of reflected, collimated, monochromatic optical input beams 28" by an amount that is dependent upon the wavelength of each of the plurality of reflected, collimated, monochromatic optical input beams 28". That is, the transmissive diffraction grating 20 operates according to the well known diffraction grating equation, $$m\lambda = d(\sin \alpha + \sin \beta)$$

wherein m is the diffraction order, λ is the wavelength, d is the diffraction grating groove spacing, α is the incident angle with respect to the diffraction grating normal, and β is the diffraction angle with respect to the diffraction grating normal. For the multiplexing device 10 shown in FIG. 1a, the diffraction angle, β, is desired to be 0°, so the incident angle, α, is equal to 45° for a center wavelength of 1550 nm and a diffraction grating having an order of 1 and a groove spacing of 0.65 μm. The reflecting angle, θ, is equal to one-half of the incident angle, α, for the multiplexing device 10 shown in FIG. 1a. So the reflecting angle, θ, is equal to 22.5° for the multiplexing device 10 shown in FIG. 1a. Of course, the present invention is not limited to the values just described as they are provided for purposes of illustration only.

At this point it should be noted that the transmissive diffraction grating 20 can be formed from a variety of materials and by a variety of techniques. For example, the transmissive diffraction grating 20 can be formed by a three-dimensional hologram in a polymer medium, or by replicating a mechanically ruled master with a polymer material. The transmissive diffraction grating 20 could then be joined or affixed to the surface of the reflecting element 18 using optical cement or some other optically transparent bonding technique. Alternatively, the transmissive diffraction grating 20 can be formed directly on the surface of the reflecting element 18, thereby avoiding the joining or affixing of the transmissive diffraction grating 20 to the surface of the reflecting element 18.

As previously mentioned, the transmissive diffraction grating 20 operates to angularly disperse the plurality of reflected, collimated, monochromatic optical input beams 28". Thus, the transmissive diffraction grating 20 removes the angular separation of the plurality of reflected, collimated, monochromatic optical input beams 28", and transmits a single collimated, polychromatic optical output beam 30' towards the diffractive optic focusing lens 22. The single collimated, polychromatic optical output beam 30' contains each of the unique wavelengths of the plurality of reflected, collimated, monochromatic optical input beams 28". Thus, the single collimated, polychromatic optical output beam 30' is a single collimated, multiplexed, polychromatic optical output beam 30'. The diffractive optic focusing lens 22 focuses the single collimated, multiplexed, polychromatic optical output beam 30', and then transmits the resulting single multiplexed, polychromatic optical output beam 30 to the output fiber coupling device 24 where it becomes incident upon the single optical output fiber 26. The single multiplexed, polychromatic optical output beam 30 is then coupled into the single optical output fiber 26 for transmission therethrough.

At this point it should be noted that the single multiplexed, polychromatic optical output beam 30 is insured of being directed to the single optical output fiber 22 in a very efficient manner (i.e., with very low insertion losses and negligible channel crosstalk) by virtue of the enhanced imaging of both the input optical beams 28 and output optical beam 30 within the multiplexing device 10 through the use of the diffractive optic collimating lens 16 and the diffractive optic focusing lens 22. This enhanced imaging of both the input optical beams 28 and output optical beam 30 within the multiplexing device 10 is a direct result of the diffractive optic collimating lens 16 and the diffractive optic focusing lens 22 being diffractive optic type lenses rather than refractive optic type lenses, as described in more detail below.

There are two basic types of transmission optics: refractive optics and diffractive optics. Heretofore, most lenses have been refractive optic lenses, which have been used in applications such as, for example, eyeglasses, microscopes, and binoculars. A refractive optic lens is typically fabricated such that the lens material (e.g., glass, crystalline, or plastic) has a varying thickness and smooth, spherical curved surfaces. Incoming light is bent or refracted based upon the angle of incidence of the incoming light and the change in refractive index at each lens surface. To a lesser extent, differences in the thickness of the lens material also affect the degree to which incoming light is bent. To bend incoming light at a large angle, both a steep curvature and a large refractive index change at a lens surface are required. Typically, multiple refractive optic lenses are necessary to bend light to the degree required for collimating or focusing light. However, aberrations resulting from the use of spherical lenses often cause actual performance to be significantly less than desired for demanding optical designs, including WDM devices of the basic design described herein. To remedy this problem, lens-makers typically craft expensive and difficult-to-make nonspherical lenses.

A diffractive optic lens, on the other hand, works by breaking up an incoming wave of light into a large number of wavelets, which recombine to form a completely new wave or waves at an exit surface of the diffractive optic lens. The new wave(s) can move in a direction that is the same as or different from the direction of the incoming light wave depending upon the profile of the diffractive optic lens. A diffractive optic lens can also convert a single input light beam into multiple output light beams, focus an input light beam onto a point or into a pattern, homogenize an input light beam, or diffuse an input light beam into a controlled area.

Figure 2B:
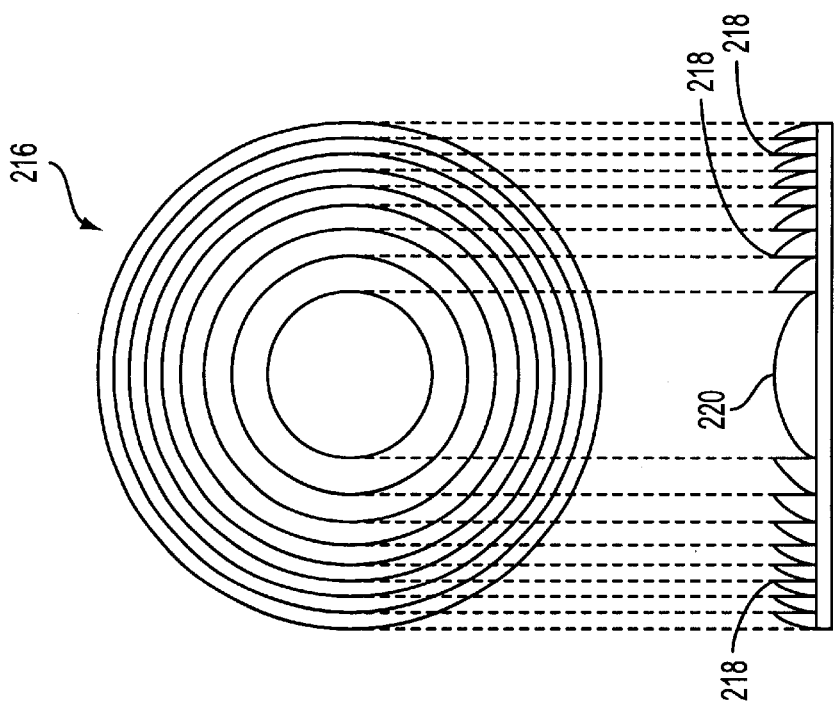
FIG. 2b is an end and a cross-sectional view of a Fresnel diffractive optic lens having a concentric circular pattern of peaks surrounding a center raised region applied to the lens material.
Figure 2A:
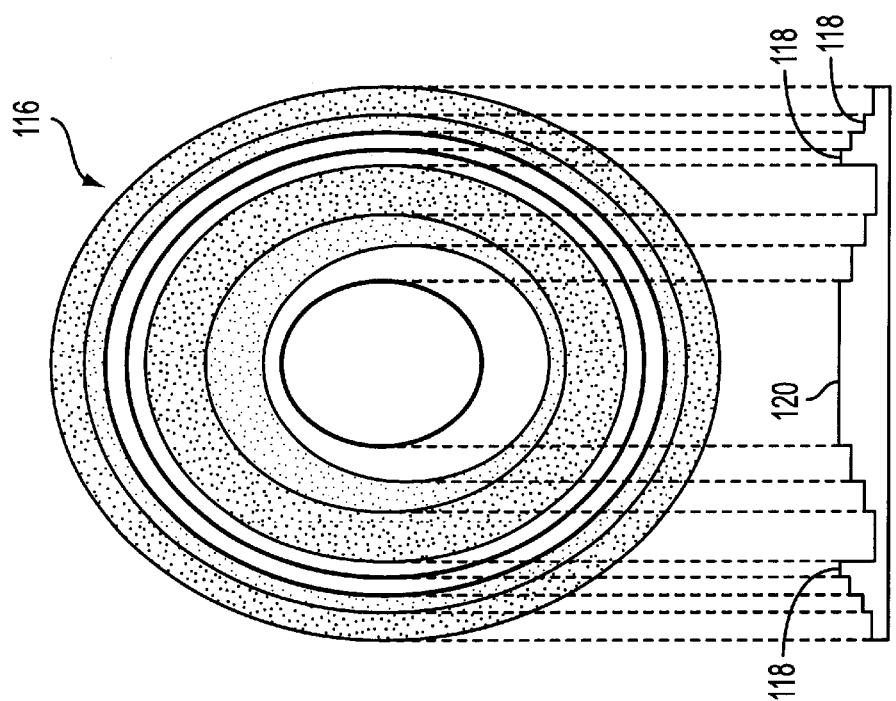
FIG. 2a is an end and a cross-sectional view of a binary diffractive optic lens having a concentric circular pattern of steps surrounding a center raised region etched into the lens material.

A diffractive optic lens breaks up an incoming light wave by forcing it through a microscopic pattern that is formed on a surface of the lens material (e.g., glass, crystalline, or plastic). The microscopic pattern is typically formed on the surface of the lens material using a photolithography process. It should be noted that the microscopic pattern can also be applied, transferred, or replicated onto a lens or substrate surface using optical cement or some other optically transparent bonding technique. The microscopic pattern can take many forms but, for the purpose of collimating and focusing light beams in accordance with the present invention, the microscopic pattern may take the form of a concentric circular pattern of steps or peaks surrounding a center raised region, all being centered about an optical axis. One type of diffractive optic lens is a binary diffractive optic lens, which generally has block-like steps. Another type of diffractive optic lens is a Fresnel diffractive optic lens, which generally has curved peaks. Referring to FIG. 2a, there is shown an end and a cross-sectional view of a binary diffractive optic lens 116 having a concentric circular pattern of steps 118 surrounding a center raised region 120. In FIG. 2a, the microscopic pattern is shown etched into the lens material. Referring to FIG. 2b, there is shown an end and a cross-sectional view of a Fresnel diffractive optic lens 216 having a concentric circular pattern of peaks 218 surrounding a center raised region 220. In FIG. 2b, the microscopic pattern is shown applied to the lens material. The size and spacing of the stairs, peaks, and center raised region determine how the incoming light will be affected, as is commonly known in the art. In general, the size of the features is on the order of the wavelength of the light that is incident on the lens.

At this point it should be noted that the microscopic pattern need only be formed on one surface of a diffractive optic lens. That is, the microscopic pattern need only be formed on either the front or back surface of a diffractive optic lens in order for the lens to be functional. Also, the microscopic pattern that is formed on a diffractive optic lens is indeed microscopic such that the surface having the microscopic pattern is typically substantially planar. The surface not having the microscopic pattern is also typically substantially planar. The fact that both surfaces of a diffractive optic lens (i.e., the front patterned surface and the back unpatterned surface, or vice versa) are typically substantially planar is an important aspect of the present invention when forming an integrated device using one or more diffractive optic lenses, as described in more detail below.

A diffractive optic lens can typically achieve 90 percent or greater focusing or coupling efficiency, and while a conventional refractive optic lens commonly requires one or more lenses together to bend light, a diffractive optic lens can perform the same function with a thickness as small as a thousandth of a millimeter. Also, by choosing the appropriate steepness and spacing of the steps or the peaks, it is possible to avoid or eliminate problems such as spherical and other types of aberrations. Furthermore, diffractive optic lenses, when produced in large quantities, are often significantly cheaper and more uniform than refractive optic lenses for performing even relatively simple optical functions such as collimating and focusing. Additionally, once an original diffractive optic lens has been fabricated, it can be reproduced through embossing, plastic injection molding, or batch photolithographic processing, thereby reducing the cost of multiple diffractive optic lenses.

Figure 3A:
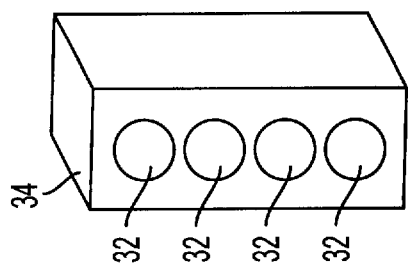

At this point it should be noted that the plurality of optical input fibers 12 could be replaced in the multiplexing device 10 by a corresponding plurality of laser diodes 32 secured within a coupling device 34, such as shown in FIG. 3a. The coupling device 34 performs a similar function to the input fiber coupling device 14, that being to precisely group the plurality of laser diodes 32 into a one-dimensional input array. The plurality of laser diodes 32 are used in place of the plurality of optical input fibers 12 to transmit the plurality of monochromatic optical input beams 28 to the multiplexing device 10. The array of laser diodes 32 may operate alone, or may be used with appropriate focusing lenses to provide the best coupling and the lowest amount of signal loss and channel crosstalk.

Figure 4:
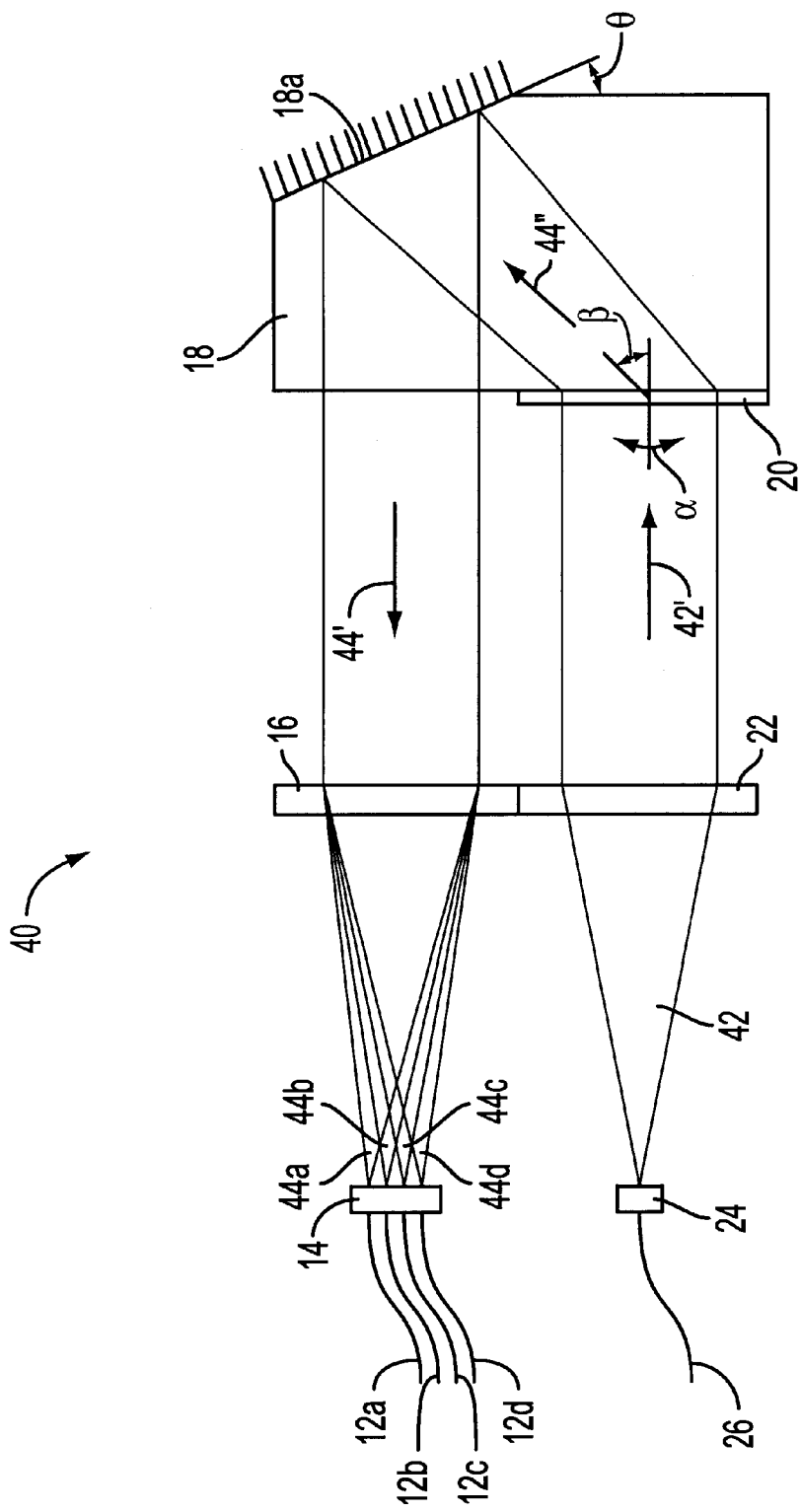
FIG. 4 is a side view of a wavelength division demultiplexing device having dual diffractive optic collimating/focusing lenses and a transmissive diffraction grating in accordance with the present invention.

At this point it should be noted that the multiplexing device 10, as well as all of the multiplexing devices described herein, may be operated in a converse configuration as a demultiplexing device 40, such as shown in FIG. 4. The demultiplexing device 40 is physically identical to the multiplexing device 10, and is therefore numerically identified as such. However, the demultiplexing device 40 is functionally opposite to the multiplexing device 10, wherein the diffractive optic collimating lens 16 now functions as a diffractive optic focusing lens 16 and the diffractive optic focusing lens 22 now functions as a diffractive optic collimating lens 22. That is, a single multiplexed, polychromatic optical input beam 42 is transmitted from the single optical fiber 26, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. In this case, the single multiplexed, polychromatic optical input beam 42 is separated into the plurality of monochromatic optical output beams 44 through the combined operation of the diffractive optic collimating lens 22, the transmissive diffraction grating 20, and the diffractive optic focusing lens 16. That is, the diffractive optic collimating lens 22 collimates the single multiplexed, polychromatic optical input beam 42 to provide a single collimated, multiplexed, polychromatic optical input beam 42'. The transmissive diffraction grating 20 spatially separates the single collimated, multiplexed, polychromatic optical input beam 42' into a plurality of collimated, monochromatic optical input beams 44", which are reflected off the reflecting surface 18a to provide a plurality of reflected, collimated, monochromatic optical input beams 44'. The diffractive optic focusing lens 16 focuses the plurality of reflected, collimated, monochromatic optical input beams 44' to provide the plurality of monochromatic optical output beams 44. Thus, the diffractive optic collimating lens 22, the transmissive diffraction grating 20, and a diffractive optic focusing lens 16 operate to perform a demultiplexing function. Of course, in this case, the incident angle, $\alpha$, and the diffraction angle, $\beta$, are reversed in comparison to the multiplexing device 10 shown in FIG. 1a, and the reflecting angle, $\theta$, is equal to one-half of the diffraction angle, $\beta$.

Figure 3B:
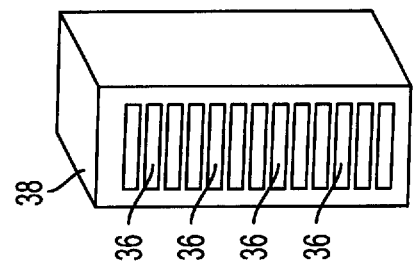
FIG. 3b is a perspective view of a coupling device containing a plurality of photodetectors for replacing the plurality of optical input fibers in the demultiplexing device shown in FIG. 4.

At this point it should be noted that the plurality of optical fibers 12 could be replaced in the demultiplexing device 40 by a corresponding plurality of photodetectors 36 secured within a coupling device 38, such as shown in FIG. 3b. The coupling device 38 performs a similar function to the fiber coupling device 14, that being to precisely group the plurality of photodetectors 36 into a one-dimensional output array. The plurality of photodetectors 36 are used in place of the plurality of optical fibers 12 to receive the plurality of monochromatic optical output beams 44 from the demultiplexing device 40. The array of photodetectors 36 may operate alone, or may be used with appropriate focusing lenses to provide the best coupling and the lowest amount of signal loss and channel crosstalk.

Figure 5:
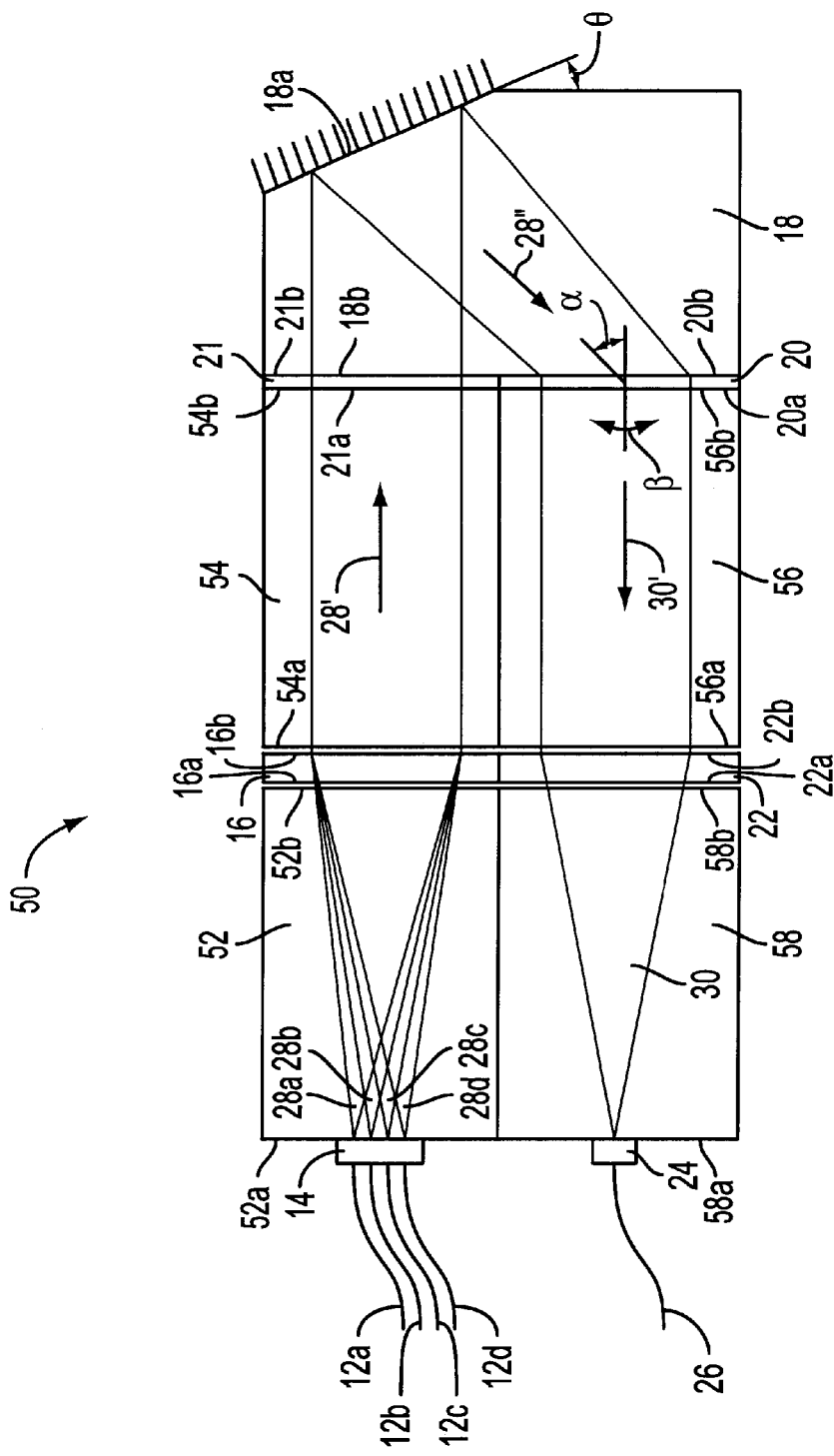
FIG. 5 is a side view of an integrated wavelength division multiplexing device having dual diffractive optic collimating/focusing lenses and a transmissive diffraction grating in accordance with the present invention.

Referring to FIG. 5, there is shown a side view of an alternate embodiment of a wavelength division multiplexing device 50 in accordance with the present invention. The multiplexing device 50 is physically identical to the multiplexing device 10, except for the addition of a first homogeneous index boot lens 52 between the input fiber coupling device 14 and the diffractive optic collimating lens 16, a second homogeneous index boot lens 54 and an optional spacer 21 between the diffractive optic collimating lens 16 and the reflecting element 18, a third homogeneous index boot lens 56 between the transmissive diffraction grating 20 and the diffractive optic focusing lens 22, and a fourth homogeneous index boot lens 58 between the diffractive optic focusing lens 22 and the output fiber coupling device 24. The first homogeneous index boot lens 52, the second homogeneous index boot lens 54, the third homogeneous index boot lens 56, and the fourth homogeneous index boot lens 58 are preferably fabricated, for example, of fused silica (n=1.444), although numerous other optical glass materials may also be used. The optional spacer 21 is also preferably fabricated of an optical glass such as, for example, fused silica, and is used to maintain the spacing and alignment between the various parts of the multiplexing device 50.

The first homogeneous index boot lens 52 has a planar front surface 52a for mating with the input fiber coupling device 14 and the associated secured optical input fibers 12. The input fiber coupling device 14 and the secured optical input fibers 12 may be either abutted against the planar front surface 52a or affixed to the planar front surface 52a using optical cement or some other optically transparent bonding technique, depending upon system mobility requirements and optical beam alignment and loss considerations.

The first homogeneous index boot lens 52 also has a planar back surface 52b for mating with the planar front surface 16a of the diffractive optic collimating lens 16. The planar back surface 52b of the first homogeneous index boot lens 52 is typically joined or affixed to the planar front surface 16a of the diffractive optic collimating lens 16 using optical cement or some other optically transparent bonding technique.

The second homogeneous index boot lens 54 has a planar front surface 54a for mating with the planar back surface 16b of the diffractive optic collimating lens 16. The planar front surface 54a of the second homogeneous index boot lens 54 is typically joined or affixed to the planar back surface 16b of the diffractive optic collimating lens 16 using optical cement or some other optically transparent bonding technique.

The second homogeneous index boot lens 54 also has a planar back surface 54b for typically mating with a planar front surface 21a of the optional spacer 21. The planar back surface 54b of the second homogeneous index boot lens 54 is typically joined or affixed to the planar front surface 21a of the optional spacer 21 using optical cement or some other optically transparent bonding technique.

The optional spacer 21 typically has a planar back surface 21b for typically mating with a planar interface surface 18b of the reflecting element 18. The planar back surface 21b of the optional spacer 21 is typically joined or affixed to the planar interface surface 18b of the reflecting element 18 using optical cement or some other optically transparent bonding technique.

At this point it should be noted that, instead of the optional spacer 21, the planar back surface 54b of the second homogeneous index boot lens 54 could be extended to the planar interface surface 18b of the reflecting element 18 is such additional spacing is beneficially required or desired.

Similar to the first homogeneous index boot lens 52, the fourth homogeneous index boot lens 58 has a planar front surface 58a for mating with the output fiber coupling device 24 and the associated secured optical output fiber 26. The output fiber coupling device 24 and the secured optical output fiber 26 may be either abutted against the planar front surface 58a or affixed to the planar front surface 58a using optical cement or some other optically transparent bonding technique, depending upon system mobility requirements and optical beam alignment and loss considerations.

The fourth homogeneous index boot lens 58 also has a planar back surface 58b for mating with the planar front surface 22a of the diffractive optic focusing lens 22. The planar back surface 58b of the fourth homogeneous index boot lens 58 is typically joined or affixed to the planar front surface 22a of the diffractive optic focusing lens 22 using optical cement or some other optically transparent bonding technique.

Similar to the second homogeneous index boot lens 54, the third homogeneous index boot lens 56 has a planar front surface 56a for mating with the planar back surface 22b of the diffractive optic focusing lens 22. The planar front surface 56a of the third homogeneous index boot lens 56 is typically joined or affixed to the planar back surface 22b of the diffractive optic focusing lens 16 using optical cement or some other optically transparent bonding technique.

The third homogeneous index boot lens 56 also has a planar back surface 56b for typically mating with a planar front surface 20a of the transmissive diffraction grating 20. The planar back surface 56b of the third homogeneous index boot lens 56 is typically joined or affixed to the planar front surface 20a of the transmissive diffraction grating 20 using optical cement or some other optically transparent bonding technique.

The transmissive diffraction grating 20 typically has a planar back surface 20b for typically mating with the planar interface surface 18b of the reflecting element 18. The planar back surface 20b of the transmissive diffraction grating 20 is typically joined or affixed to the planar interface surface 18b of the reflecting element 18 using optical cement or some other optically transparent bonding technique.

At this point it should be noted that, as with the multiplexing device 10, the transmissive diffraction grating 20 can be formed directly on the planar interface surface 18b of the reflecting element 18, thereby avoiding the joining or affixing of the transmissive diffraction grating 20 to the reflecting element 18 or the third homogeneous index boot lens 56, and also avoiding the need for the optional spacer 21. Alternatively, the transmissive diffraction grating 20 can be formed directly on the planar back surface 56b of the third homogeneous index boot lens 56, thereby avoiding the joining or affixing of the transmissive diffraction grating 20 to the reflecting element 18 or the third homogeneous index boot lens 56, and also avoiding the need for the optional spacer 21.

In any of the above-described cases, the transmissive diffraction grating 20 is integrated along with at least the reflecting element 18, the diffractive optic collimating lens 16, the diffractive optic focusing lens 22, and the homogeneous index boot lenses 52, 54, 56, and 58, to form a compact, rigid, and environmentally and thermally stable multiplexing device 50. The integrated nature of this multiplexing device 50 is particularly useful for maintaining component alignment, which provides long-term performance in contrast to some non-integrated air-spaced devices that characteristically degrade in alignment and therefore performance over time.

At this point it should be noted that, as previously described, the microscopic patterns can be formed on either the planar front surface 16a or the planar back surface 16b of the diffractive optic collimating lens 16, or the planar front surface 22a or the planar back surface 22b of the diffractive optic focusing lens 22, without substantially changing the planar characteristics of those surfaces. Thus, regardless of which surfaces possess the microscopic patterns, the planar characteristics of both the planar front surface 16a and the planar back surface 16b of the diffractive optic collimating lens 16, and the planar characteristics of both the planar front surface 22a and the planar back surface 22b of the diffractive optic focusing lens 22, allow for easy mating and integrated assembly with the planar back surface 52b of the first homogeneous index boot lens 52 and the planar front surface 54a of the second homogeneous index boot lens 54, and with the planar back surface 58b of the fourth homogeneous index boot lens 58 and the planar front surface 56a of the third homogeneous index boot lens 56, respectively. These planar characteristics of the diffractive optic collimating lens 16 and the diffractive optic focusing lens 22 are particularly beneficial when viewed in comparison to a refractive optic lens, which typically has at least one curved surface.

The multiplexing device 50 is functionally identical to the multiplexing device 10, except for a slight decrease in optical beam transmission efficiency due to the addition of the homogeneous index boot lenses 52, 54, 56, and 58, and the optional spacer 21. However, even with this slight decrease in optical beam transmission efficiency, the optical performance of the multiplexing device 50 is still exceptional due to the use of diffractive optic type lenses instead of refractive optic type lenses for the collimating lens 16 and the focusing lens 22. That is, as previously described, the use of diffractive optic type lenses for the collimating lens 16 and the focusing lens 22 can be used to eliminate aberrations caused by the spherical nature of refractive optic type lenses. And these aberrations are still eliminated despite the addition of the homogeneous index boot lenses 52, 54, 56, and 58.

Figure 6:
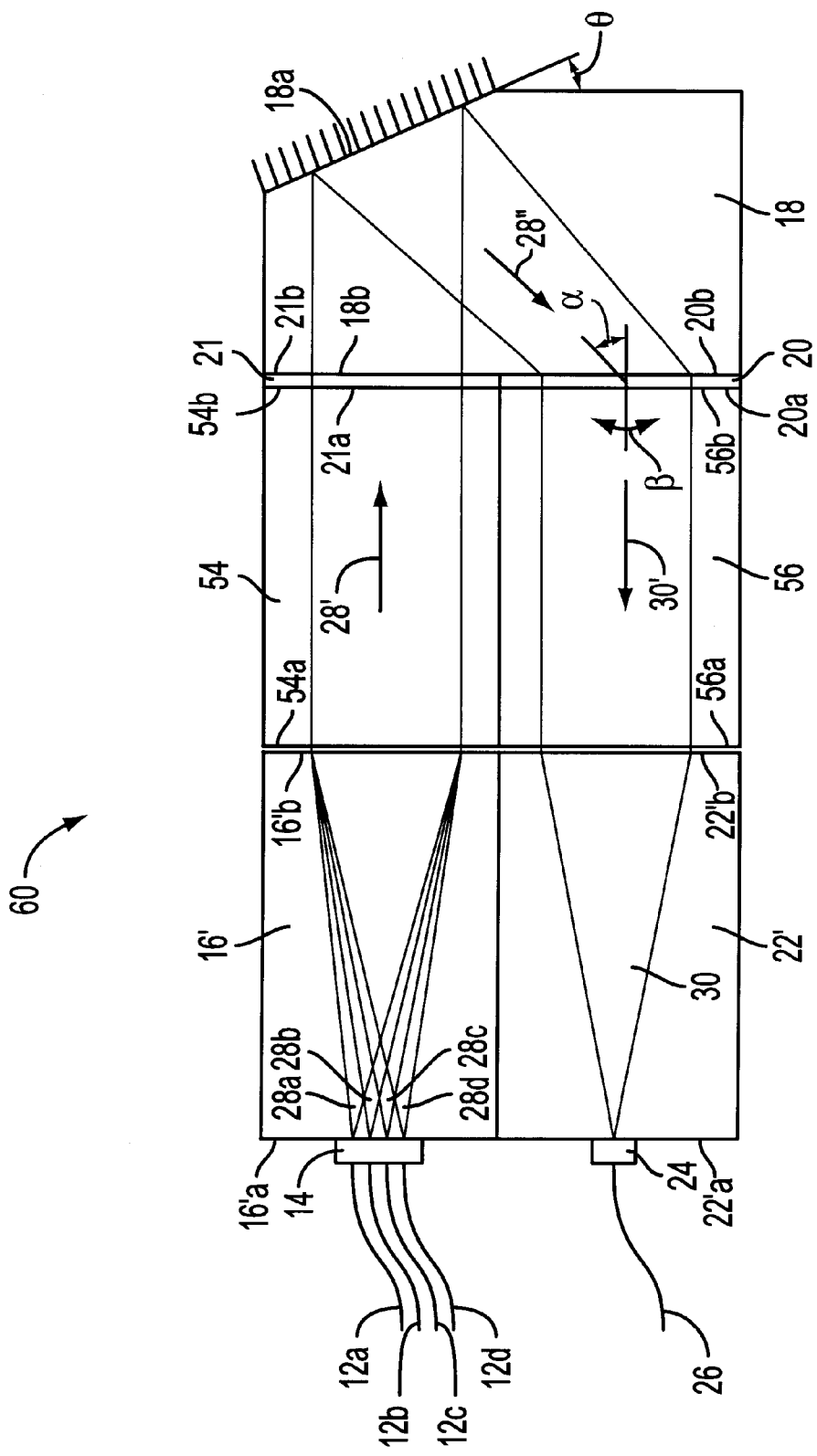
FIG. 6 is a side view of an integrated wavelength division multiplexing device having dual front extended diffractive optic collimating/focusing lenses and a transmissive diffraction grating in accordance with the present invention.

Referring to FIG. 6, there is shown a side view of an alternate embodiment of a wavelength division multiplexing device 60 in accordance with the present invention. The multiplexing device 60 is physically identical to the multiplexing device 50, except that the first homogeneous index boot lens 52 has been removed and the planar front surface 16'a of the diffractive optic collimating lens 16' has been extended so as to allow the input fiber coupling device 14 and the secured optical input fibers 12 to be either abutted against the planar front surface 16'a or affixed to the planar front surface 16'a using optical cement or some other optically transparent bonding technique, depending upon system mobility requirements and optical beam alignment and loss considerations, and that the fourth homogeneous index boot lens 58 has been removed and the planar front surface 22'a of the diffractive optic focusing lens 22' has been extended so as to allow the output fiber coupling device 24 and the secured optical output fiber 26 to be either abutted against the planar front surface 22'a or affixed to the planar front surface 22'a using optical cement or some other optically transparent bonding technique, depending upon system mobility requirements and optical beam alignment and loss considerations. In this case, the microscopic patterns are formed on the planar back surface 16'b of the diffractive optic collimating lens 16' and the planar back surface 22'b of the diffractive optic focusing lens 22' without substantially changing the planar characteristics of those surfaces. Similar to the multiplexing device 50, the integrated nature of the multiplexing device 60 is particularly useful for maintaining component alignment, which provides long-term performance in contrast to some non-integrated air-spaced devices that characteristically degrade in alignment and therefore performance over time. The multiplexing device 60 is functionally identical to the multiplexing device 50, except for a slight increase in optical beam transmission efficiency due to the removal of the first homogeneous index boot lens 52 and the fourth homogeneous index boot lens 58.

Figure 7:
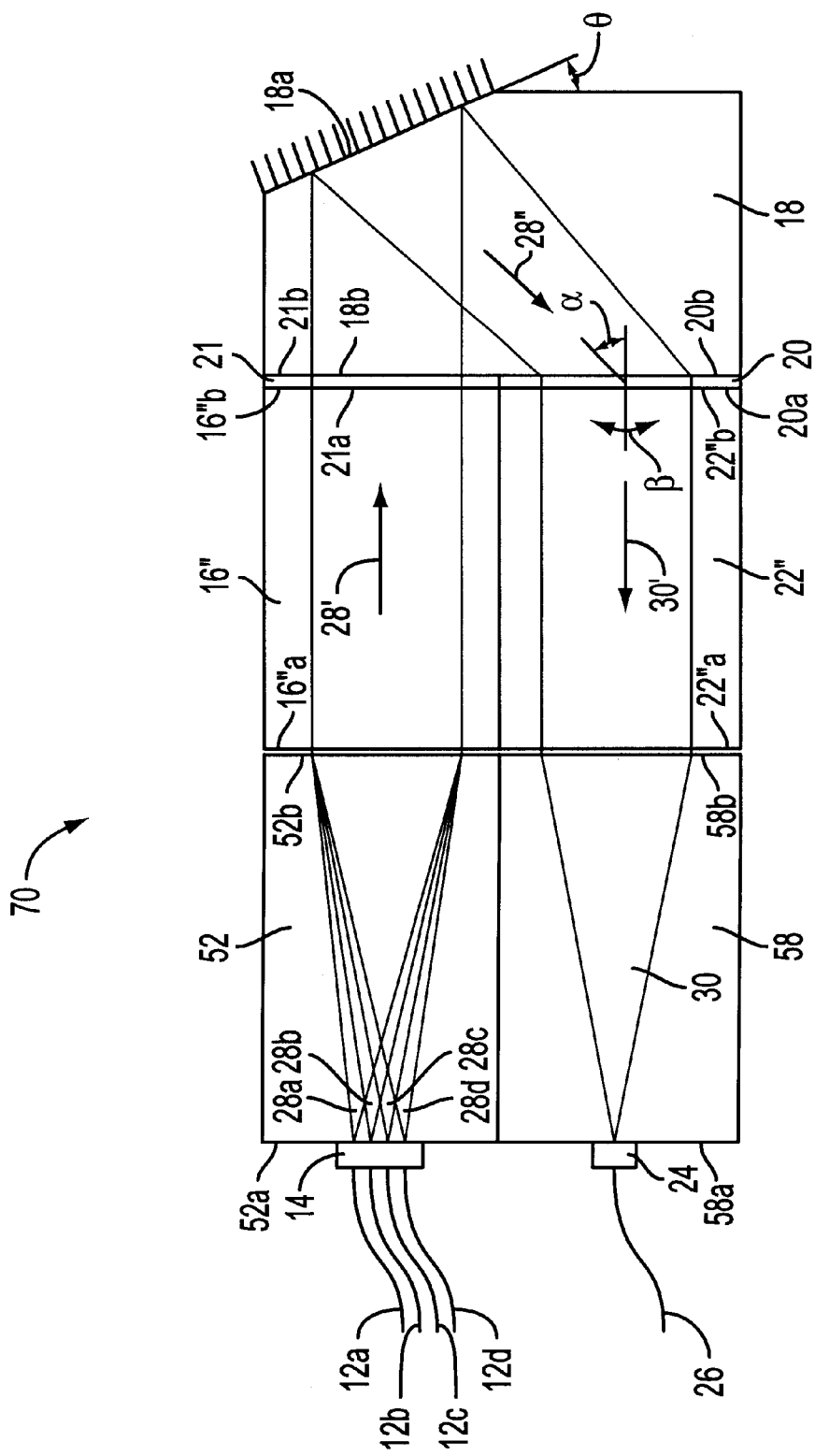
FIG. 7 is a side view of an integrated wavelength division multiplexing device having dual back extended diffractive optic collimating/focusing lenses and a transmissive diffraction grating in accordance with the present invention.

Referring to FIG. 7, there is shown a side view of an alternate embodiment of a wavelength division multiplexing device 70 in accordance with the present invention. The multiplexing device 70 is physically identical to the multiplexing device 50, except that the second homogeneous index boot lens 54 has been removed and the planar back surface 16"b of the diffractive optic collimating lens 16" has been extended out to the planar front surface 21a of the optional spacer 21 so as to allow the planar back surface 16"b of the diffractive optic collimating lens 16" and the planar front surface 21a of the optional spacer 21 to be directly joined or affixed using optical cement or some other optically transparent bonding technique, and that the third homogeneous index boot lens 56 has been removed and the planar back surface 22"b of the diffractive optic focusing lens 22" has been extended out to the planar front surface 20a of the transmissive diffraction grating 20 so as to allow the planar back surface 22"b of the diffractive optic collimating lens 22" and the planar front surface 20a of the transmissive diffraction grating 20 to be directly joined or affixed using optical cement or some other optically transparent bonding technique. In this case, the microscopic patterns are formed on the planar front surface 16"a of the diffractive optic collimating lens 16" and the planar front surface 22"a of the diffractive optic focusing lens 22" without substantially changing the planar characteristics of those surfaces.

As with the multiplexing device 10, the transmissive reflective diffraction grating 20 can be formed using a separate material, and this material can then be joined or affixed to the planar back surface 22"b of the diffractive optic focusing lens 22" using optical cement or some other optically transparent bonding technique. Alternatively, the transmissive diffraction grating 20 can be formed directly on the planar back surface 22"b of the diffractive optic focusing lens 22" or the planar interface surface 18b of the reflecting element 18, thereby avoiding the joining or affixing of the transmissive diffraction grating 20 to the diffractive optic focusing lens 22" or the reflecting element 18, and also avoiding the need for the optional spacer 21. In either case, the transmissive diffraction grating 20 is integrated along with at least the reflecting element 18, the diffractive optic collimating lens 16", the diffractive optic focusing lens 22", and the homogeneous index boot lenses 52 and 58, to form a compact, rigid, and environmentally and thermally stable multiplexing device 70. Similar to the multiplexing device 50, the integrated nature of the multiplexing device 70 is particularly useful for maintaining component alignment, which provides long-term performance in contrast to some non-integrated air-spaced devices that characteristically degrade in alignment and therefore performance over time. The multiplexing device 70 is functionally identical to the multiplexing device 50, except for a slight increase in optical beam transmission efficiency due to the removal of the second homogeneous index boot lens 54 and the third homogeneous index boot lens 56.

At this point it should be noted that any of the homogeneous index boot lenses 52, 54, 56, and 58 may be removed from the multiplexing device 50, either of the homogeneous index boot lenses 54, 56 may be removed from the multiplexing device 60, and either of the homogeneous index boot lenses 52, 58 may be removed from the multiplexing device 70, in order to create additional alternate embodiments (not shown) while still retaining the above-described benefits of using a diffractive optic type lenses instead of refractive optic type lenses for the diffractive optic collimating lens 16 and the diffractive optic focusing lens 22.

Figure 8:
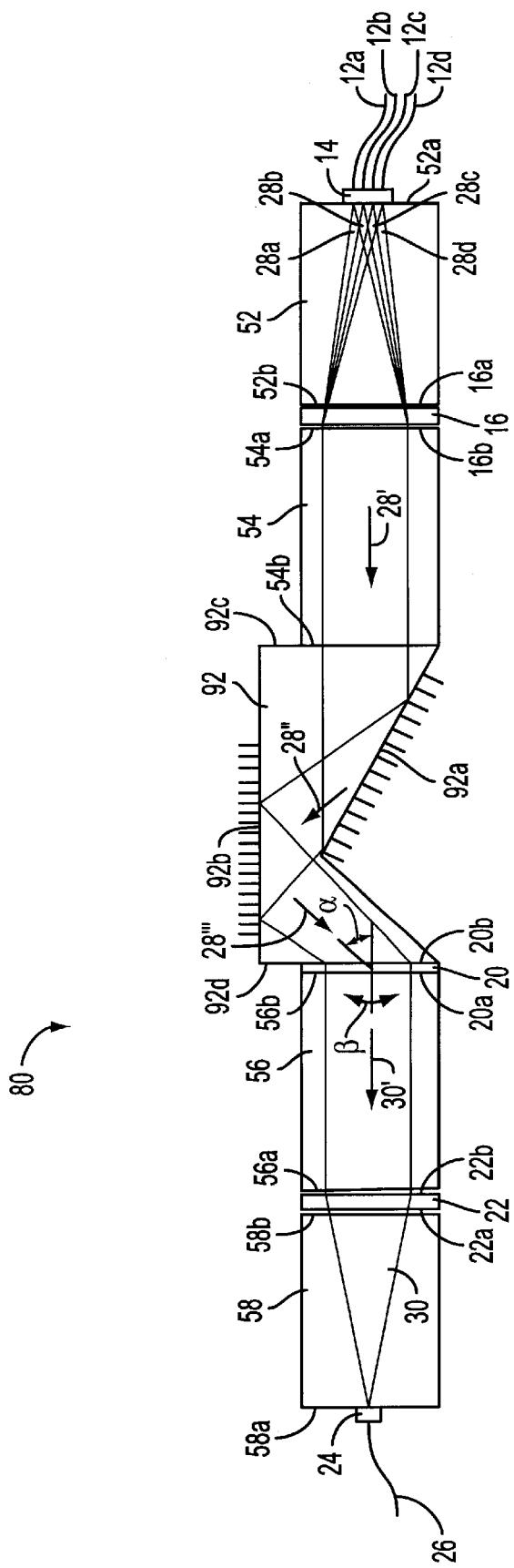
FIG. 8 is a side view of an integrated in-line wavelength division multiplexing device having dual diffractive optic collimating/focusing lenses and a transmissive diffraction grating in accordance with the present invention.

Referring to FIG. 8, there is shown a side view of an alternate embodiment of a wavelength division multiplexing device 80 in accordance with the present invention. The multiplexing device 80 differs from the previously described embodiments by having an in-line geometry rather than the folded geometry of the previously described embodiments. This in-line geometry is achieved through the use of a dual reflecting element 92, which has a first reflecting surface 92a for reflecting the plurality of collimated, monochromatic optical input beams 28' and a second reflecting surface 92b for reflecting the plurality of reflected, collimated, monochromatic optical input beams 28". Note that, in contrast to the previously described embodiments, the multiplexing device 80 does not require the optional spacer 21 to maintain the spacing and alignment between the various parts of the multiplexing device 80. Otherwise, the multiplexing device 80 is functionally identical to and utilizes all of the components used in the multiplexing device 50, except of course the reflecting element 18.

In accordance with the practices described above, any of the homogeneous index boot lenses 52, 54, 56, and 58 can be removed from the multiplexing device 80 and/or either one of the diffractive optic collimating lens 16 or the diffractive optic focusing lens 22 can be extended in the multiplexing device 80 in order to create additional alternate embodiments (not shown) while still retaining the above-described benefits of using diffractive optic type lenses instead of refractive optic type lenses for the diffractive optic collimating lens 16 and the diffractive optic focusing lens 22. The benefits and detriments associated with using these substitute/additional components are applicable to the multiplexing device 80 as would be the case with the previously described embodiments. Of course, the most significant benefits come from the use of diffractive optic type lenses instead of refractive optic type lenses for the diffractive optic collimating lens 16 and the diffractive optic focusing lens 22. That is, regardless of embodiment, the use of diffractive optic type lenses in WDM devices yields increased device performance, as well as reduced device cost, complexity, and manufacturing risk. Simply said, the use of diffractive optic type lenses allows for the construction of a family of simple, low cost, yet very powerful WDM devices, particularly for use in DWDM (i.e., high channel number) applications.

At this point it should be noted that additional lenses can be added to the above described devices if such is required or desired to further increase the performance of the devices. For example, additional diffractive optic lenses or refractive optic lenses can be added to the above described devices if such is required to further increase the fiber coupling efficiency (FCE) of the devices. In contrast to a measure of insertion loss, the FCE of a WDM device expresses the efficiency of only the optical system of the WDM device for each data channel, without taking into account the efficiency of the diffraction grating. In these situations, a trade-off is typically made between a small increase in the FCE and the additional cost associated with adding additional lenses to a device.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A wavelength division multiplexing device comprising:
   a diffractive optic collimating lens for collimating a plurality of monochromatic optical beams;
   a diffraction grating for combining the plurality of collimated, monochromatic optical beams into a multiplexed, polychromatic optical beam; and
   a diffractive optic focusing lens for focusing the multiplexed, polychromatic optical beam.

2. The device of claim 1, wherein the diffraction grating is a transmissive diffraction grating.

3. The device of claim 2, further comprising:
   a transmissive element associated with the transmissive diffraction grating, the transmissive element having at least one reflective surface for reflecting the multiplexed, polychromatic optical beam.

4. The device of claim 2, further comprising:
   a transmissive element associated with the transmissive diffraction grating, the transmissive element having at least one reflective surface for reflecting the plurality of collimated, monochromatic optical beams.

5. The device of claim 1, wherein the diffractive optic collimating lens and the diffractive optic focusing lens operate in the infrared region of the electromagnetic spectrum.

6. The device of claim 1, wherein the diffractive optic collimating lens and the diffractive optic focusing lens have substantially planar front and back surfaces.

7. The device of claim 6, wherein a microscopic pattern is formed on either the substantially planar front surface or the substantially planar back surface of the diffractive optic collimating lens and the diffractive optic focusing lens.

8. The device of claim 1, wherein the diffractive optic collimating lens and the diffractive optic focusing lens are formed of a material selected from the group consisting of glass, crystalline, and plastic.

9. An integrated wavelength division multiplexing device comprising:
   a diffractive optic collimating lens for collimating a plurality of monochromatic optical beams;
   a homogeneous index boot lens affixed to the diffractive optic collimating lens for transmitting the plurality of collimated, monochromatic optical beams from the diffractive optic collimating lens, the homogeneous index boot lens having a planar exit surface; and
   a diffraction grating formed at the planar exit surface of the homogeneous index boot lens for combining the plurality of collimated, monochromatic optical beams into a multiplexed, polychromatic optical beam.

10. The device as defined in claim 9, wherein the homogeneous index boot lens is incorporated into the diffractive optic collimating lens such that the diffractive optic collimating lens has the planar exit surface at which the diffraction grating is formed.

11. The device of claim 9, wherein the homogeneous index boot lens is a first homogeneous index boot lens, the device further comprising:
   a second homogeneous index boot lens affixed to the diffractive optic collimating lens for transmitting the plurality of monochromatic optical beams to the diffractive optic collimating lens.

12. The device of claim 11, wherein the second homogeneous index boot lens has a planar entry surface for accepting the plurality of monochromatic optical beams from at least one optical source.

13. The device of claim 9, wherein the diffractive optic collimating lens has a planar entry surface for accepting the plurality of monochromatic optical beams from at least one optical source.

14. The device of claim 9, wherein the diffraction grating is a transmissive diffraction grating.

15. The device of claim 14, further comprising:
   a transmissive element associated with the transmissive diffraction grating, the transmissive element having at least one reflective surface for reflecting the multiplexed, polychromatic optical beam.

16. The device of claim 15, wherein the homogeneous index boot lens is a first homogeneous index boot lens, the device further comprising:
   a second homogeneous index boot lens affixed to the transmissive element for transmitting the multiplexed, polychromatic optical beam from the transmissive element; and
   a diffractive optic focusing lens affixed to the second homogeneous index boot lens for focusing the multiplexed, polychromatic optical beam.

17. The device as defined in claim 16, wherein the second homogeneous index boot lens is incorporated into the diffractive optic focusing lens such that the diffractive optic focusing lens is affixed to the transmissive element.

18. The device of claim 16, further comprising:
   a third homogeneous index boot lens affixed to the diffractive optic focusing lens for transmitting the focused, multiplexed, polychromatic optical beam from the diffractive optic focusing lens.

19. The device of claim 18, wherein the third homogeneous index boot lens has a planar exit surface for outputting the focused, multiplexed, polychromatic optical beam to at least one optical receiver.

20. The device of claim 16, wherein the diffractive optic focusing lens has a planar exit surface for outputting the focused, multiplexed, polychromatic optical beam to at least one optical receiver.

21. An integrated wavelength division multiplexing device comprising:
   a diffractive optic focusing lens for focusing a multiplexed, polychromatic optical beam;
   a homogeneous index boot lens affixed to the diffractive optic focusing lens for transmitting the multiplexed, polychromatic optical beam to the diffractive optic focusing lens, the homogeneous index boot lens having a planar entry surface; and
   a diffraction grating formed at the planar entry surface of the homogeneous index boot lens for combining a plurality of monochromatic optical beams into the multiplexed, polychromatic optical beam.

22. The device as defined in claim 21, wherein the homogeneous index boot lens is incorporated into the diffractive optic focusing lens such that the diffractive optic focusing lens has the planar entry surface at which the diffraction grating is formed.

23. The device of claim 21, wherein the diffraction grating is a transmissive diffraction grating.

24. The device of claim 23, further comprising:
   a transmissive element associated with the transmissive diffraction grating, the transmissive element having at least one reflective surface for reflecting the plurality of monochromatic optical beams toward the transmissive diffraction grating.

25. The device of claim 24, wherein the homogeneous index boot lens is a first homogeneous index boot lens, the device further comprising:
a second homogeneous index boot lens affixed to the transmissive element for transmitting the plurality of monochromatic optical beams to the transmissive element; and
a diffractive optic collimating lens affixed to the second homogeneous index boot lens for collimating the plurality of monochromatic optical beams prior to transmission by the second homogeneous index boot lens.

26. The device as defined in claim 25, wherein the second homogeneous index boot lens is incorporated into the diffractive optic collimating lens such that the diffractive optic collimating lens is affixed to the transmissive element.

27. A wavelength division demultiplexing device comprising:
a diffractive optic collimating lens for collimating a multiplexed, polychromatic optical beam;
a diffraction grating for separating the collimated, multiplexed, polychromatic optical beam into a plurality of monochromatic optical beams; and
a diffractive optic focusing lens for focusing the plurality of monochromatic optical beams.

28. The device of claim 27, wherein the diffraction grating is a transmissive diffraction grating.

29. The device of claim 28, further comprising:
a transmissive element associated with the transmissive diffraction grating, the transmissive element having at least one reflective surface for reflecting the collimated, multiplexed, polychromatic optical beam.

30. The device of claim 28, further comprising:
a transmissive element associated with the transmissive diffraction grating, the transmissive element having at least one reflective surface for reflecting the plurality of monochromatic optical beams.

31. The device of claim 27, wherein the diffractive optic collimating lens and the diffractive optic focusing lens operate in the infrared region of the electromagnetic spectrum.

32. The device of claim 27, wherein the diffractive optic collimating lens and the diffractive optic focusing lens have substantially planar front and back surfaces.

33. The device of claim 32, wherein a microscopic pattern is formed on either the substantially planar front surface or the substantially planar back surface of the diffractive optic collimating lens and the diffractive optic focusing lens.

34. The device of claim 27, wherein the diffractive optic collimating lens and the diffractive optic focusing lens are formed of a material selected from the group consisting of glass, crystalline, and plastic.

35. An integrated wavelength division demultiplexing device comprising:
a diffractive optic collimating lens for collimating a multiplexed, polychromatic optical beam;
a homogeneous index boot lens affixed to the diffractive optic collimating lens for transmitting the collimated, multiplexed, polychromatic optical beam from the diffractive optic collimating lens, the homogeneous index boot lens having a planar exit surface; and
a diffraction grating formed at the planar exit surface of the homogeneous index boot lens for separating the collimated, multiplexed, polychromatic optical beam into a plurality of monochromatic optical beams.

36. The device as defined in claim 35, wherein the homogeneous index boot lens is incorporated into the diffractive optic collimating lens such that the diffractive optic collimating lens has the planar exit surface at which the diffraction grating is formed.

37. The device of claim 35, wherein the homogeneous index boot lens is a first homogeneous index boot lens, the device further comprising:
a second homogeneous index boot lens affixed to the diffractive optic collimating lens for transmitting the multiplexed, polychromatic optical beam to the diffractive optic collimating lens.

38. The device of claim 37, wherein the second homogeneous index boot lens has a planar entry surface for accepting the multiplexed, polychromatic optical beam from at least one optical source.

39. The device of claim 35, wherein the diffractive optic collimating lens has a planar entry surface for accepting the multiplexed, polychromatic optical beam from at least one optical source.

40. The device of claim 35, wherein the diffraction grating is a transmissive diffraction grating.

41. The device of claim 40, further comprising:
a transmissive element associated with the transmissive diffraction grating, the transmissive element having at least one reflective surface for reflecting the plurality of monochromatic optical beams.

42. The device of claim 41, wherein the homogeneous index boot lens is a first homogeneous index boot lens, the device further comprising:
a second homogeneous index boot lens affixed to the transmissive element for transmitting the plurality of monochromatic optical beams from the transmissive element; and
a diffractive optic focusing lens affixed to the second homogeneous index boot lens for focusing the plurality of monochromatic optical beams.

43. The device as defined in claim 42, wherein the second homogeneous index boot lens is incorporated into the diffractive optic focusing lens such that the diffractive optic focusing lens is affixed to the transmissive element.

44. The device of claim 42, further comprising:
a third homogeneous index boot lens affixed to the diffractive optic focusing lens for transmitting the plurality of focused, monochromatic optical beams from the diffractive optic focusing lens.

45. The device of claim 44, wherein the third homogeneous index boot lens has a planar exit surface for outputting the plurality of focused, monochromatic optical beams to at least one optical receiver.

46. The device of claim 42, wherein the diffractive optic focusing lens has a planar exit surface for outputting the plurality of focused, monochromatic optical beams to at least one optical receiver.

47. An integrated wavelength division demultiplexing device comprising:
a diffractive optic focusing lens for focusing a plurality of monochromatic optical beams;
a homogeneous index boot lens affixed to the diffractive optic focusing lens for transmitting the plurality of monochromatic optical beams to the diffractive optic focusing lens, the homogeneous index boot lens having a planar entry surface; and
a diffraction grating formed at the planar entry surface of the homogeneous index boot lens for separating a multiplexed, polychromatic optical beam into the plurality of monochromatic optical beams.

48. The device as defined in claim 47, wherein the homogeneous index boot lens is incorporated into the diffractive optic focusing lens such that the diffractive optic focusing lens has the planar entry surface at which the diffraction grating is formed.

49. The device of claim 47, wherein the diffraction grating is a transmissive diffraction grating.

50. The device of claim 49, further comprising:

a transmissive element associated with the transmissive diffraction grating, the transmissive element having at least one reflective surface for reflecting the multiplexed, polychromatic optical beam toward the transmissive diffraction grating.

51. The device of claim 50, wherein the homogeneous index boot lens is a first homogeneous index boot lens, the device further comprising:

a second homogeneous index boot lens affixed to the transmissive element for transmitting the multiplexed, polychromatic optical beam to the transmissive element; and a diffractive optic collimating lens affixed to the second homogeneous index boot lens for collimating the multiplexed, polychromatic optical beam prior to transmission by the second homogeneous index boot lens.

52. The device as defined in claim 51, wherein the second homogeneous index boot lens is incorporated into the diffractive optic collimating lens such that the diffractive optic collimating lens is affixed to the transmissive element.

* * * * *